United States Patent
Sankara et al.

(10) Patent No.: US 11,268,474 B2
(45) Date of Patent: Mar. 8, 2022

(54) BANK TO BANK TRIMMING SYSTEM FOR A LOCOMOTIVE ENGINE

(71) Applicant: Progress Rail Locomotive Inc., LaGrange, IL (US)

(72) Inventors: Reddy Pocha Siva Sankara, Naperville, IL (US); Gregory L. Armstrong, Edwards, IL (US); Raji Rexavier, Plainfield, IL (US); Michael B. Goetzke, Orland Park, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 0 days.

(21) Appl. No.: 16/871,273

(22) Filed: May 11, 2020

(65) Prior Publication Data

US 2021/0348578 A1    Nov. 11, 2021

(51) Int. Cl.
*F02D 41/40*    (2006.01)
*F02M 26/13*    (2016.01)
*B61L 3/00*    (2006.01)

(52) U.S. Cl.
CPC .............. *F02D 41/40* (2013.01); *B61L 3/006* (2013.01); *F02M 26/13* (2016.02); *F02D 2200/101* (2013.01); *F02D 2200/70* (2013.01)

(58) Field of Classification Search
CPC ............... F02D 41/40; F02D 2200/101; F02D 2200/70; F02M 26/13; B61L 3/006
USPC .......................................................... 701/19
See application file for complete search history.

(56) References Cited

U.S. PATENT DOCUMENTS

| | | | |
|---|---|---|---|
| 9,534,530 B2 | 1/2017 | Glugla et al. | |
| 9,903,289 B2 | 2/2018 | Zielinski et al. | |
| 10,030,617 B2 | 7/2018 | Akinyemi et al. | |
| 10,215,115 B1 | 2/2019 | Ranga et al. | |
| 2009/0099755 A1* | 4/2009 | Harbert | F02D 41/0087 701/103 |
| 2009/0107456 A1* | 4/2009 | Pallett | F02D 37/02 123/299 |
| 2009/0150042 A1* | 6/2009 | Redon | F02D 41/403 701/102 |
| 2016/0115895 A1* | 4/2016 | Ochi | F02D 41/3017 123/305 |
| 2016/0160811 A1* | 6/2016 | Deb | F02M 26/43 123/568.2 |

* cited by examiner

*Primary Examiner* — Mahmoud Gimie
(74) *Attorney, Agent, or Firm* — von Briesen & Roper, s.c.

(57) ABSTRACT

A method of bank to bank trimming for a locomotive engine during steady state operation comprises receiving a plurality of operating parameter signals, receiving a fuel quantity signal for each of a standard cylinder bank and a donor cylinder bank, providing a trim map, determining whether the engine is operating in a steady state condition based on the plurality of operating parameter signals, determining a target fuel injection duration for each of the standard cylinder bank and the donor cylinder bank if the engine is operating in a steady state condition, and adjusting an actual fuel injection duration to equal the target fuel injection duration for the standard cylinder bank and the donor cylinder bank.

20 Claims, 4 Drawing Sheets

BANK TO BANK TRIMMING SYSTEM FOR A LOCOMOTIVE ENGINE

TECHNICAL FIELD

The present disclosure relates generally to locomotive engines and, more specifically, relates to exhaust gas recirculation in locomotive engines.

BACKGROUND

Locomotives are used extensively to transport people and large quantities of materials across the country. Locomotive engines must meet government regulations dictating exhaust emission limits for a number of substances, including nitrogen oxides (NOx). One common means of reducing NOx emissions is exhaust gas recirculation (EGR). In an engine equipped with an EGR system exhaust from some cylinders of the engine is redirected back into the air intake. This reduces the oxygen available for combustion, resulting in less NOx formation.

However, in order to direct exhaust flow into the air intake, many systems create back pressure on the donor cylinders which provide the recirculated exhaust. The backpressure reduces the breathing capacity of the donor cylinders. This results in a lower air to fuel ratio, producing higher temperatures in the exhaust gas and parts of the cylinder, in particular the donor cylinder heads. Over time, the increased temperature can damage the cylinder heads and other exhaust components and make the engine less reliable. Moreover, the lower air to fuel ratio can lead to increased emissions of particulate matter.

U.S. Pat. No. 9,903,289 to Zielinski et al. discloses an EGR system in which the amount of fuel injected into each cylinder is different between a first and a second group. This system operates during transitional periods to allow for more rapid response to changing conditions. However, there is a need for a system which more completely and directly addresses the complications caused by the EGR system backpressure.

SUMMARY OF THE DISCLOSURE

According to one aspect of the present disclosure, a method of bank to bank trimming for a locomotive engine during steady state operation is disclosed. The method comprises receiving a plurality of operating parameter signals, receiving a fuel quantity signal for each of a standard cylinder bank and a donor cylinder bank, providing a trim map, determining whether the engine is operating in a steady state condition based on the plurality of operating parameter signals, if the engine is operating in a steady state condition, determining a target fuel injection duration for each of the standard cylinder bank and the donor cylinder bank based on a trim map, the fuel quantity signals, and the plurality of operating parameter signals, determining a target fuel injection duration for each of the standard cylinder bank and the donor cylinder bank, and adjusting an actual fuel injection duration to equal the target fuel injection duration for standard cylinder bank and the donor cylinder bank.

According to another aspect of the present disclosure, an EGR bank to bank trimming system for a locomotive engine is disclosed. The system includes a donor cylinder bank, a standard cylinder bank, and a control module. The control module is configured to receive a plurality of operating parameter signals, receive a fuel quantity signal for each of the standard cylinder bank and the donor cylinder bank, determine whether the engine is operating at a steady state condition based on the plurality of operating parameter signals, determine a target fuel injection duration for each of the standard cylinder bank and the donor cylinder bank if the engine is operating at a steady state condition, and adjust an actual fuel injection duration to equal the target fuel injection duration for the standard cylinder bank and the donor cylinder bank.

According to yet another aspect of the present disclosure, a locomotive is disclosed. The locomotive includes a frame, an envelope supported by the frame, at least one set of drive wheels supporting the frame, an engine supported by the frame and providing power to the drive wheels, and a control module. The engine includes a donor cylinder bank, and a standard cylinder bank. The control module is configured to receive a plurality of operating parameter signals, receive a fuel quantity signal for each of the standard cylinder bank and the donor cylinder bank, determine whether the engine is operating at a steady state condition based on the plurality of operating parameter signals, determine a target fuel injection duration for each of the standard cylinder bank and the donor cylinder bank if the engine is operating at a steady state condition, and adjust an actual fuel injection duration to equal the target fuel injection duration for the standard cylinder bank and the donor cylinder bank.

These and other aspects and features of the present disclosure will be more readily understood after reading the following detailed description in conjunction with the accompanying drawings.

DETAILED DESCRIPTION

Figure 1:
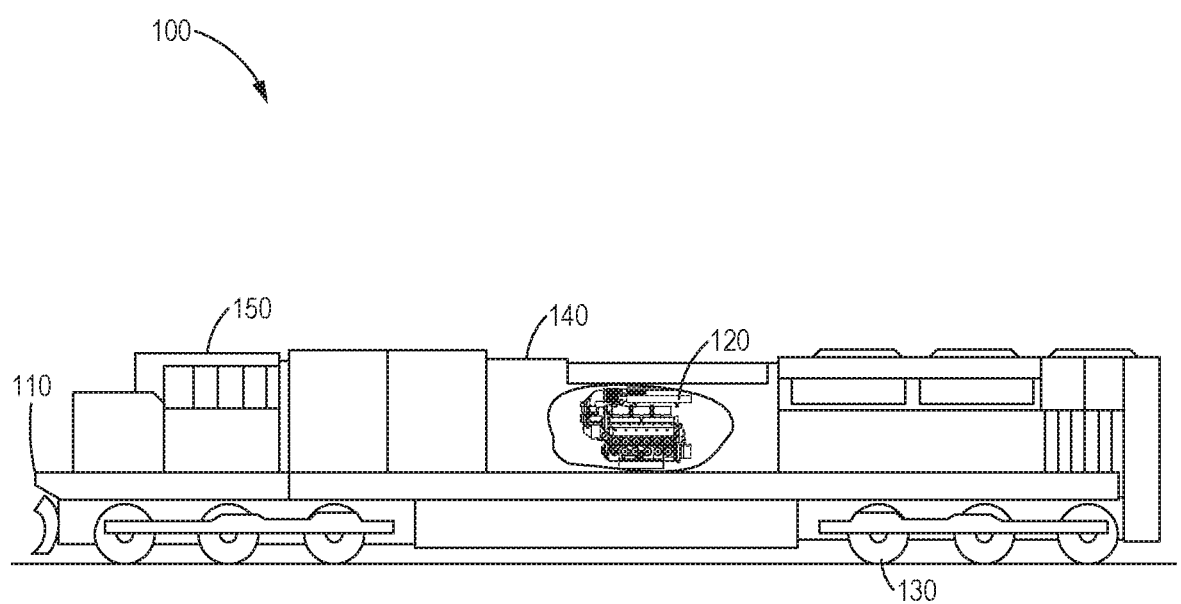
FIG. 1 is a schematic diagram of one embodiment of a locomotive according to the present disclosure.

Referring now to the drawings, and with specific reference to FIG. 1, a locomotive constructed in accordance with the present disclosure is generally referred to by reference numeral 100. A locomotive 100 is an engine car which provides motive power to the rest of a train (not shown). The locomotive 100 includes a base 110, an engine 120 supported by the base 100, at least one set of drive wheels 130 supporting the base 110 and driven by the engine 120, and an envelope 140 covering the base 110 and engine 120. The locomotive 100 typically also includes an operator cab 150.

In one embodiment, the engine 120 is an internal combustion diesel engine having twelve cylinders. In other embodiments, the engine 120 may have other numbers of cylinders. Such engines 120 have to meet government imposed emissions regulations. In particular, strict regulations place limits on the quantity of nitrogen oxides (NOx) emitted by the engine 120.

One commonly used method for controlling NOx emissions is exhaust gas recirculation (EGR). NOx is produced by internal combustion at high temperatures with excess oxygen and nitrogen. An EGR system recirculates some of the exhaust gas produced by the engine into the air intake.

Reducing the available air by replacing a portion with exhaust gas results in lower NOx production.

Figure 2:
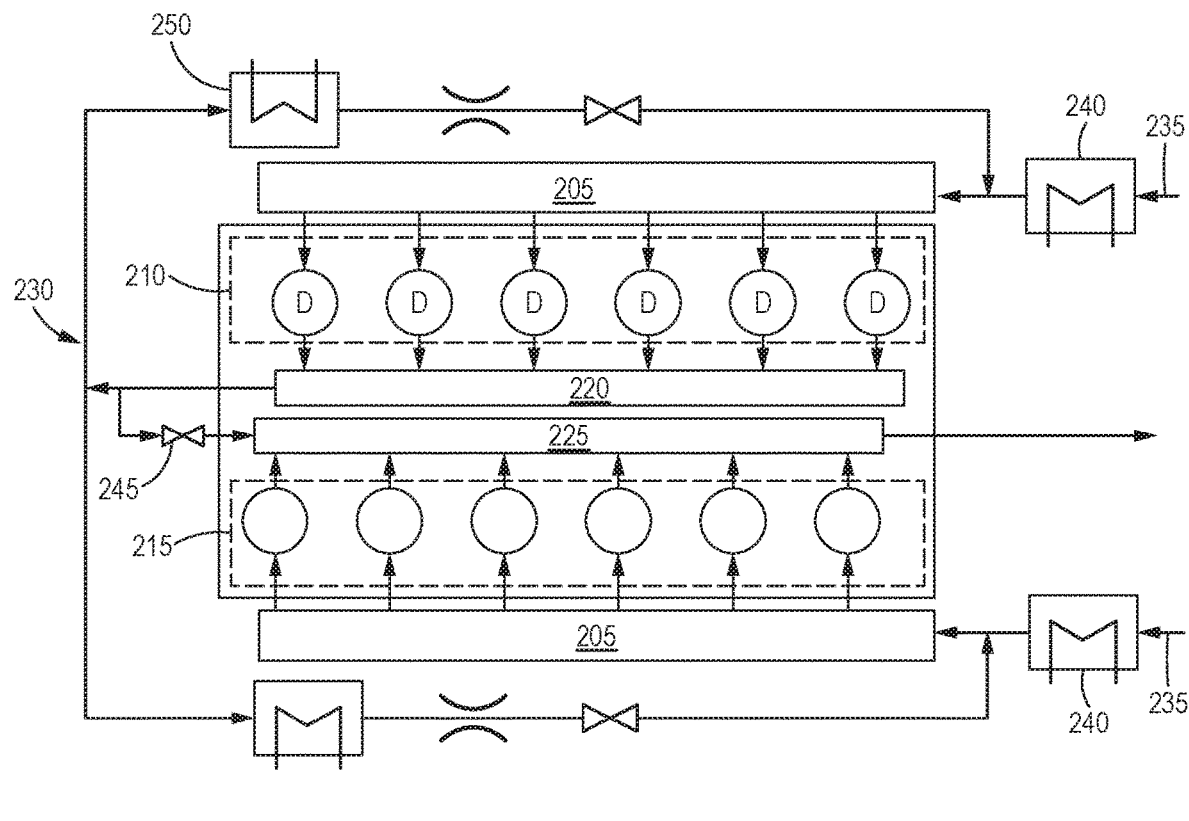
FIG. 2 is a schematic diagram of an engine with an EGR system according to one aspect of the present disclosure.

An engine 200 equipped with an EGR system is depicted in FIG. 2. The engine 200 includes an air intake system 235, one or two intake manifolds 205, two cylinder banks 210, 215, two exhaust manifolds 220, 225, an EGR system 230, and an exhaust system (not shown).

In the illustrated embodiment, each cylinder bank 210, 215 has an air intake manifold 205 and an exhaust manifold 220, 225. In some other embodiments, the cylinder banks 210, 215 may share a single air intake manifold 205. Air is pulled into the system through the air intake system 235. The air intake system 235 may include one or more turbochargers (not shown) which compress the air prior to being cooled in a heat exchanger 240.

As the engine 200 operates, the cylinders 210, 215 compress air in each cylinder in turn, increasing the temperature. Fuel is then injected into the compressed air with a fuel injector (not shown). The fuel ignites from the heat of the compressed air and drives the cylinder 210, 215 back down. This produces an exhaust gas which passes into the exhaust manifold 220. 225 of that cylinder bank 210, 215.

The EGR system 230 recirculates exhaust from one of the cylinder banks 210, hereafter referred to as a donor cylinder bank 210. The exhaust from the other cylinder bank 215, hereafter referred to as a standard cylinder bank 215, is directed through a standard bank exhaust manifold 225 to an exhaust system (not shown). In the illustrated embodiment, there are six cylinders in the donor cylinder bank 210 and six cylinders in the standard cylinder bank 215. In other various embodiments, the engine 200 may have any desired numbers of donor bank cylinders and standard bank cylinders, with the number of donor cylinders typically lower than the number of non-donor cylinders.

The exhaust system may include driving turbo-chargers and after treatment to further reduce emissions. The exhaust from the donor cylinder bank 210 passes through a donor bank exhaust manifold 220 into the EGR system 230. The exhaust is cooled by exhaust heat exchangers 250 before being added to the air intake prior to the intake manifolds 205. The amount of exhaust recirculated is controlled by an EGR valve 245. The remaining un-recirculated exhaust passes through the EGR valve 245, through the standard bank exhaust manifold 225, and then out to the exhaust system.

In order to achieve flow from the EGR system 230 into the air intake system 235, the gas in the EGR system 230 must be at a higher pressure than the air intake 235. The pressure is controlled by the EGR valve 245. As a result of the high pressure in the EGR system 230, there is significant back pressure on the cylinders of the donor cylinder bank 210. This additional back pressure reduces the breathing capacity of the donor bank cylinders 210. This will result into a lower air to fuel ratio for the donor bank cylinders 210 which leads to higher temperatures in the exhaust gas and cylinder heads (not shown). These higher temperatures can lead to engine reliability issues of the cylinder heads and other exhaust components on the donor cylinders 210. In addition, the lower air to fuel ratio on the donor cylinders 210 will also lead to increases in particulate emissions from the donor cylinders 210 of the engine 200.

These problems are addressed by injecting a different amount of injected quantity on the donor bank cylinders 210 compared to the standard bank cylinders 215. This process of intentional biasing of the fuel quantity based on bank position is called bank to bank trimming. In a typical engine 200, all cylinders 210, 215 receive a similar injected quantity of fuel. However, if a slightly lower amount of fuel is injected into the donor cylinder bank 210, the fuel to air ratios across the engine 200 can be balanced, thereby reducing temperatures and improving reliability of the engine 200 and its components. The amount of fuel injected is determined by the duration of fuel injection.

Figure 3:
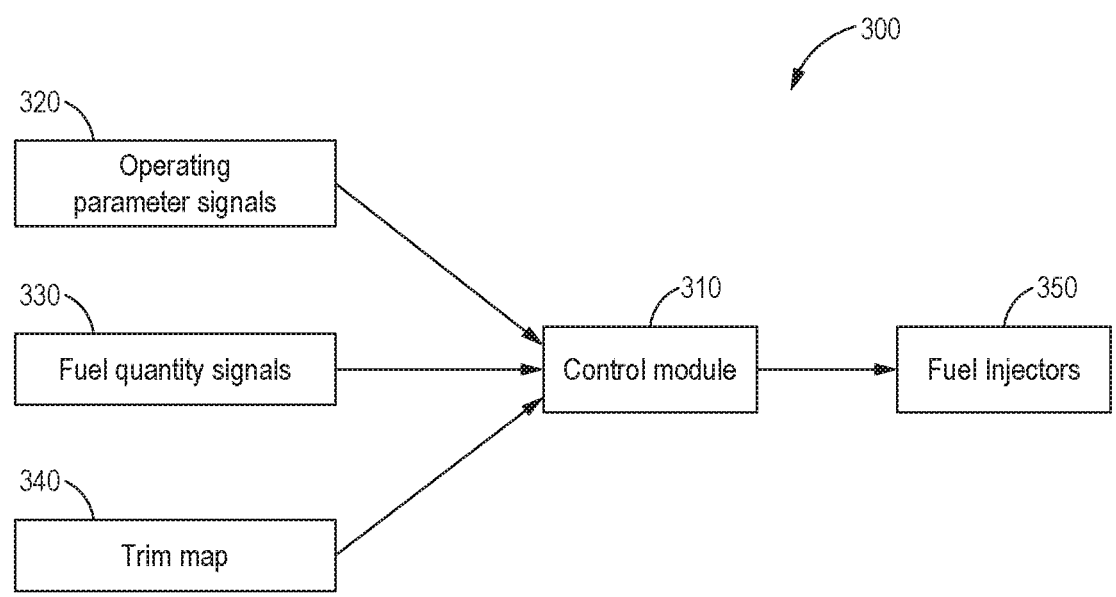
FIG. 3 is a schematic representation of a bank to bank trimming system according to one aspect of the present disclosure.

The system of bank to bank trimming 300 is depicted in FIG. 3. A control module 310 is configured to receive numerous input signals 320, 330 from sensors, input devices, and other control modules. These signals 320, 330 include the engine's operating parameters 230, and the fuel quantity 330 which has been injected into each cylinder bank 210, 215. Operating parameters 320 include the engine speed, engine power, and the ambient conditions such as air temperature, air pressure, humidity, and any other condition which may affect engine operation. The control module 310 is further provided with a trim map 340. The trim map 340 provides information on how much adjustment in injection duration is required for each cylinder bank 210, 215 at a variety of engine operating conditions, as defined by the operating parameters 320 and the fuel quantity 330.

Based on the operating parameter signals 320, the control module 310 determines whether the engine 200 is operating in a steady state condition. A steady state condition exists when the engine 200 is operating at a consistent set of operating parameters, in particular engine speed and engine power. In a steady state condition, a speed ramp rate, and a load ramp rate are approximately zero. The trimming system 300 operates only during steady state conditions to avoid overshooting the necessary adjustments. When the engine 200 is not in steady state operation, no bank to bank trimming will be carried out. Both the cylinder banks 210, 215 receive equal fuel injection quantities within the manufacturing variabilities of the fuel injectors 350.

If the engine 200 is in a steady state condition, the control module 310 determines a target fuel injection duration for each cylinder bank 210, 215 based on the operating parameter signals 320, fuel quantity signals 330 for each cylinder bank 210, 215, and the trim map. The target fuel injection duration for the donor cylinder bank 210 is less than the target fuel injection duration for the standard cylinder bank 215. The target fuel injection duration for the donor cylinder bank 210 is configured to avoid excessive temperatures in the donor cylinder bank 210.

The control module 310 then adjusts an actual fuel injection duration to equal the target fuel injection duration for the standard cylinder bank 215 and the donor cylinder bank 210. The fuel injectors 350 can then inject the required amount of fuel into each cylinder to maintain a temperature in the cylinders that will not cause damage.

INDUSTRIAL APPLICABILITY

In operation, the bank to bank trimming system 300 of the present disclosure would be useful in a variety of industrial applications, such as, but not limited to, any application in which the use of an EGR system to comply with strict NOx emission requirements results in excessive backpressure and damage to the donor cylinder bank. Such applications may include motor vehicles, locomotives, and stationary diesel engines as well as non-engine sources of NOx such as power plants, boilers, and other industrial activities.

Figure 4:
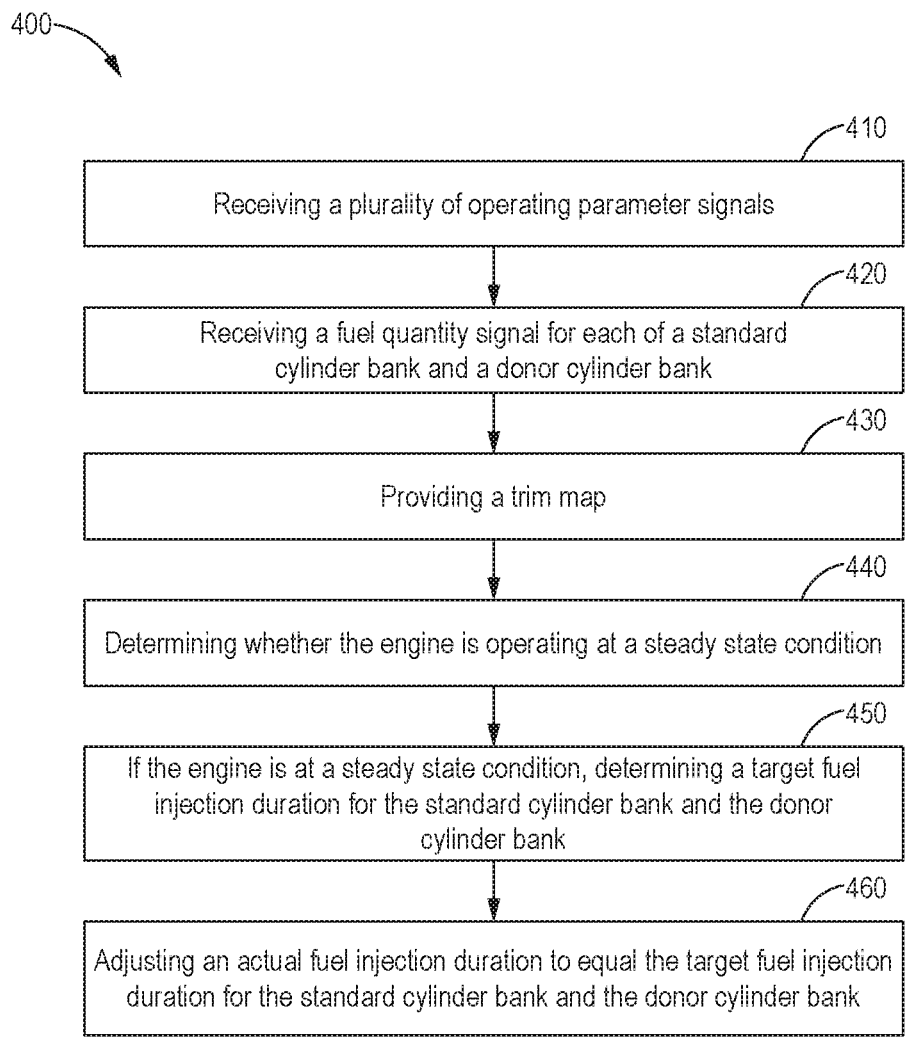
FIG. 4 is a flowchart representation of a method of providing a bank to bank trimming system according to one aspect of the present disclosure.

The bank to bank trimming system 300 may be put into effect by the method described in FIG. 4. The method 400 may begin by receiving a plurality of operating parameter signals (block 410) and receiving a fuel quantity signal for each of a standard cylinder bank 215 and a donor cylinder bank 210 (block 420). Operating parameters 320 include the engine speed, engine power, and the ambient conditions such as air temperature, air pressure, humidity, and any other condition which may affect engine operation. Concurrently to this, a trim map is provided to the control module (block 430). The trim map 340 provides information on how much adjustment in injection duration is required for each cylinder bank 210, 215 at a variety of engine operating conditions, as defined by the operating parameters 320 and the fuel quantity 330.

Based on the operating parameter signals 340, the control module 310 determines whether the engine 200 is operating at a steady state condition, as shown in block 440. A steady state condition exists when the engine 200 is operating at a consistent set of operating parameters, in particular engine speed and engine power. The trimming system 300 operates only during steady state conditions to avoid overshooting the necessary adjustments. When the engine 200 is not in steady state operation, no bank to bank trimming will be carried out. Both the cylinder banks 210, 215 would then receive equal fuel injection quantities within the manufacturing variabilities of the fuel injectors 350.

If the engine 200 is at a steady state condition, the method then determines a target fuel injection duration for each of the standard cylinder bank 215 and the donor cylinder bank 210 (block 450) using the trim map, operating parameter signals, and fuel quantity signal. The target fuel injection duration for the donor cylinder bank 210 is less than the target fuel injection duration for the standard cylinder bank 215. The target fuel injection duration for the donor cylinder bank 210 is configured to avoid excessive temperatures in the donor cylinder bank 210.

Finally, the control module directs the fuel injectors to adjust an actual fuel injection duration to equal the target fuel injection duration for the standard cylinder bank 215 and the donor cylinder bank 210 (block 460).

While the preceding text sets forth a detailed description of numerous different embodiments, is should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A method of bank to bank trimming for a locomotive engine during steady state operation, comprising:
   receiving a plurality of operating parameter signals;
   receiving a fuel quantity signal for each of a standard cylinder bank and a donor cylinder bank, each fuel quantity signal indicating a volume of fuel injected into one of the standard cylinder bank and the donor cylinder bank, a sum of the volumes of fuel corresponding to a total fuel quantity;
   providing a trim map, the trim map indicating a fuel injection duration adjustment amount for each of the standard cylinder bank and the donor cylinder bank based on the plurality of operating parameter signals and the total fuel quantity;
   determining whether the engine is operating in a steady state condition based on the plurality of operating parameter signals;
   if the engine is operating in a steady state condition, determining a target fuel injection duration for each of the standard cylinder bank and the donor cylinder bank based on the indicated fuel injection duration adjustment amount and an actual fuel injection duration for each of the standard cylinder bank and the donor cylinder bank; and
   adjusting the actual fuel injection durations of the standard cylinder bank and the donor cylinder bank to equal the target fuel injection durations of the standard cylinder bank and the donor cylinder bank.

2. The method of claim 1, wherein the plurality of operating signals includes engine power and engine speed.

3. The method of claim 1, wherein the plurality of operating signals includes ambient conditions.

4. The method of claim 1, wherein a steady state condition exists when the engine is operating at a consistent set of operating parameters.

5. The method of claim 1, wherein the target fuel injection duration for the donor cylinder bank is less than the target fuel injection duration for the standard cylinder bank.

6. The method of claim 1, wherein the target fuel injection duration for the donor cylinder bank is configured to avoid excessive temperatures in the donor cylinder bank.

7. An EGR bank to bank trimming system for a locomotive engine, comprising
   a donor cylinder bank, the donor cylinder bank having an actual fuel injection duration, a donor fuel quantity corresponding to a volume of fuel being injected into the donor cylinder bank during the actual fuel injection duration;
   a standard cylinder bank, the standard cylinder bank having an actual fuel injection duration, a standard fuel quantity corresponding to a volume of fuel being injected into the standard cylinder bank during the actual fuel injection duration; and
   a control module configured to:
      receive a plurality of operating parameter signals,
      receive a fuel quantity signal for each of the standard cylinder bank and the donor cylinder bank, each fuel quantity signal corresponding to one of the standard fuel quantity and the donor fuel quantity, a sum of the standard fuel quantity and the donor fuel quantity corresponding to a total fuel quantity,
      determine whether the engine is operating in a steady state condition based on the plurality of operating parameter signals;
      determine a fuel duration adjustment amount for each of the standard cylinder bank and the donor cylinder bank using a trim map, the trim map indicating the fuel duration adjustment amounts based on the plurality of operating parameter signals and the total fuel quantity;
      if the engine is operating in a steady state condition, determine a target fuel injection duration for each of the standard cylinder bank and the donor cylinder bank based on the fuel injection duration adjustment amounts and the actual fuel injection durations of the standard cylinder bank and the donor cylinder bank, and
      adjust the actual fuel injection durations of the standard cylinder bank and the donor cylinder bank to equal the target fuel injection durations of the standard cylinder bank and the donor cylinder bank.

8. The system of claim 7, wherein the plurality of operating signals includes engine power.

9. The system of claim 7, wherein the plurality of operating signals includes engine speed.

10. The system of claim 7, wherein the plurality of operating signals includes ambient conditions.

11. The system of claim 7, wherein a steady state condition exists when the engine is operating at a consistent set of operating parameters.

12. The system of claim 7, wherein the target fuel injection duration for the donor cylinder bank is less than the target fuel injection duration for the standard cylinder bank.

13. The system of claim 7, wherein the target fuel injection duration for the donor cylinder bank is configured to avoid excessive temperatures in the donor cylinder bank.

14. A locomotive, comprising:
a frame;
an envelope supported by the frame;
at least one set of drive wheels supporting the frame;
an engine supported by the frame and providing power to the drive wheels, the engine including a donor cylinder bank, and a standard cylinder bank; and
a control module configured to:
receive a plurality of operating parameter signals,
receive a fuel quantity signal for each of the standard cylinder bank and the donor cylinder bank, each fuel quantity signal indicating a volume of fuel injected into one of the standard cylinder bank and the donor cylinder bank, a sum of the volumes of fuel corresponding to a total fuel quantity,
determine whether the engine is operating in a steady state condition based on the plurality of operating parameter signals;
determine a fuel duration adjustment amount for each of the standard cylinder bank and the donor cylinder bank using a trim map, the trim map indicating the fuel duration adjustment amounts based on the plurality of operating parameter signals and the total fuel quantity;
if the engine is operating in a steady state condition, determine a target fuel injection duration for each of the standard cylinder bank and the donor cylinder bank based on the fuel injection duration adjustment amounts and the actual fuel injection durations of the standard cylinder bank and the donor cylinder bank, and
adjust the actual fuel injection durations of the standard cylinder bank and the donor cylinder bank to equal the target fuel injection durations of the standard cylinder bank and the donor cylinder bank.

15. The locomotive of claim 14, wherein the plurality of operating signals includes engine power.

16. The locomotive of claim 14, wherein the plurality of operating signals includes engine speed.

17. The locomotive of claim 14, wherein the plurality of operating signals includes ambient conditions.

18. The locomotive of claim 14, wherein a steady state condition exists when the engine is operating at a consistent set of operating parameters.

19. The locomotive of claim 14, wherein the target fuel injection duration for the donor cylinder bank is less than the target fuel injection duration for the standard cylinder bank.

20. The locomotive of claim 14, wherein the target fuel injection duration for the donor cylinder bank is configured to avoid excessive temperatures in the donor cylinder bank.

* * * * *